US010287368B2

(12) United States Patent
Dworak et al.

(10) Patent No.: US 10,287,368 B2
(45) Date of Patent: May 14, 2019

(54) ALKOXYSILANE-FUNCTIONALIZED HYDROCARBON COMPOUNDS, INTERMEDIATES THEREOF AND METHODS OF PREPARATION THEREOF

(71) Applicant: Henkel IP & Holding GmbH, Duesseldorf (DE)

(72) Inventors: David P. Dworak, Middletown, CT (US); Philip T. Klemarczyk, Canton, CT (US); Anthony F. Jacobine, North Haverhill, NH (US)

(73) Assignee: Henkel IP & Holding GmbH, Duesseldorf (DE)

( * ) Notice: Subject to any disclaimer, the term of this patent is extended or adjusted under 35 U.S.C. 154(b) by 210 days.

(21) Appl. No.: 15/371,306

(22) Filed: Dec. 7, 2016

(65) Prior Publication Data

US 2017/0107306 A1 Apr. 20, 2017

Related U.S. Application Data

(63) Continuation of application No. PCT/US2015/037351, filed on Jun. 24, 2015.

(60) Provisional application No. 62/018,046, filed on Jun. 27, 2014.

(51) Int. Cl.
| | | |
|---|---|---|
| *C08G 77/06* | (2006.01) | |
| *C08F 8/42* | (2006.01) | |
| *C08L 101/10* | (2006.01) | |
| *C08F 220/18* | (2006.01) | |
| *C08K 3/36* | (2006.01) | |
| *C08K 5/42* | (2006.01) | |

(52) U.S. Cl.
CPC .............. *C08F 8/42* (2013.01); *C08F 220/18* (2013.01); *C08K 3/36* (2013.01); *C08K 5/42* (2013.01); *C08L 101/10* (2013.01); *C08F 2220/1825* (2013.01); *C08F 2800/10* (2013.01)

(58) Field of Classification Search
CPC ...................................................... C08L 101/10
See application file for complete search history.

(56) References Cited

U.S. PATENT DOCUMENTS

| | | | |
|---|---|---|---|
| 4,491,650 A | 1/1985 | Rizk et al. | |
| 5,763,548 A | 6/1998 | Matyjaszewski et al. | |
| 5,852,129 A | 12/1998 | Kusakabe et al. | |
| 5,986,014 A | 11/1999 | Kusakabe et al. | |
| 6,111,022 A | 8/2000 | Matyjaszewski et al. | |
| 6,274,688 B1 * | 8/2001 | Nakagawa | C08F 2/38 526/328 |
| 6,420,492 B1 | 7/2002 | Kusakabe et al. | |
| 6,538,091 B1 | 3/2003 | Matyjaszewski et al. | |
| 6,838,535 B2 | 1/2005 | Percec et al. | |
| 8,450,427 B2 | 5/2013 | Percec | |
| 8,729,179 B1 | 5/2014 | Klemarczyk et al. | |
| 9,567,353 B2 | 2/2017 | Warren et al. | |
| 2008/0057316 A1 * | 3/2008 | Landon | C08G 18/10 428/423.1 |
| 2012/0298299 A1 * | 11/2012 | Rutz | C08G 18/10 156/329 |
| 2016/0326344 A1 * | 11/2016 | Yano | C08K 5/103 |

FOREIGN PATENT DOCUMENTS

CN 101528599 9/2009

* cited by examiner

*Primary Examiner* — Margaret G Moore
(74) *Attorney, Agent, or Firm* — Steven C. Bauman (57) ABSTRACT

A process for preparing moisture curable compounds and moisture curable compositions prepared from the product of that process is provided.

16 Claims, 3 Drawing Sheets

ALKOXYSILANE-FUNCTIONALIZED HYDROCARBON COMPOUNDS, INTERMEDIATES THEREOF AND METHODS OF PREPARATION THEREOF

BACKGROUND

Field

A process for preparing moisture curable compounds and moisture curable compositions prepared from the product of that process is provided.

Brief Description of Related Technology

Moisture curable monomers, oligomers and polymers, and compositions made therewith, are well-known and have been described extensively and used commercially for some time.

Figure 1:
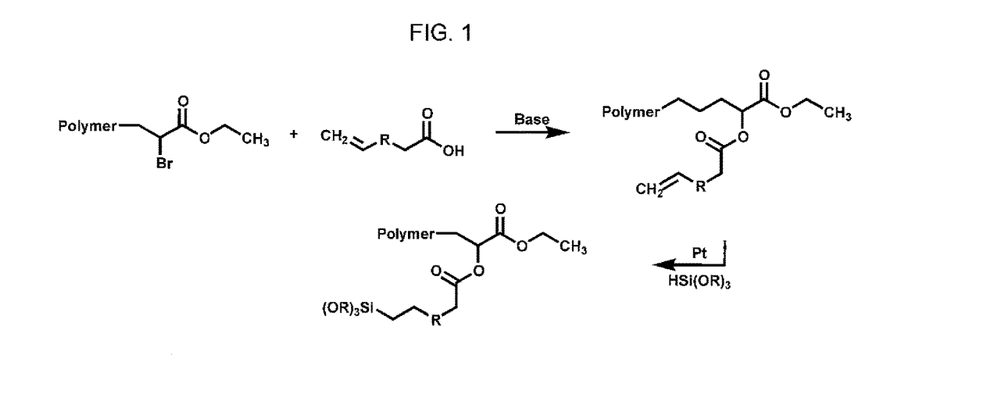
FIG. 1 shows an idealized form of a two step process used to prepare on a commercial scale moisture curable, alkoxysilane terminated polyacrylates, where a bromine substituted polymer is reacted with an unsaturated carboxylic acid followed by hydrosilation with an alkoxysilane.

One such polymer is an alkoxysilane terminated polyacrylate. Commercially available moisture curable, alkoxysilane terminated polyacrylates (such as those available from Kaneka Corporation, Japan) are currently prepared in a two step process. See also U.S. Pat. Nos. 5,986,014, 6,274,688, and 6,420,492. In a disclosed process, bromine substitution with an unsaturated carboxylic acid is followed by hydrosilation with an alkoxysilane. This two step process can be expensive and time consuming for the manufacturer. An idealized form of the synthesis is shown in FIG. 1.

Henkel Corporation has recently provided an alternative process for preparing aminoalkyl alkoxysilane-functionalized hydrocarbon compounds. See U.S. Pat. No. 8,729,179.

It would be desirable to identify still other alternative synthetic schemes by which to make such polymers and new polymers for a variety of reasons, including raw material reactant availability and reducing the complexity and the synthesis.

SUMMARY

The present invention provides such a solution to that desire.

In one aspect a process for preparing alkoxysilane-functionalized hydrocarbon compounds is provided. The process includes providing (a)

I where L is alkyl or poly(alkyl), alkylene or poly(alkylene), alkenyl or poly(alkenyl), alkenylene or poly(alkenylene), aromatic or an aromatic ring system, R is alkyl, and m is 1-10 and n is 1-4, or

II where L' is defined as L above, R" is defined as R' above, and m and n are as defined as above, and (b) an isocyanatoalkylalkoxysilane, and optionally (c) organic solvent, in a vessel and mixing for a time sufficient to form an alkoxysilane-functionalized hydrocarbon compound.

In another aspect, the alkoxysilane-functionalized hydrocarbon compounds so prepared are provided.

In one embodiment of this aspect, these alkoxysilane-functionalized hydrocarbon compounds may be used together with a curable matrix in a moisture curable composition.

In another embodiment of this aspect, a process for preparing a reaction product from the moisture curable composition, the steps of which include applying the composition to a desired substrate surface and exposing the composition to appropriate conditions for a time sufficient to cure the composition.

In still another aspect, a process that first prepares hydroxyl-functionalized compounds within structure I or II and then uses those compounds to prepare alkoxysilane-functionalized hydrocarbon compounds is provided. That process involves reacting

IA where L is alkyl or poly(alkyl), alkylene or poly(alkylene), alkenyl or poly(alkenyl), alkenylene or poly(alkenylene), aromatic or an aromatic ring system, X is a leaving group, R' is an alkyl as defined above, and n is 1-4, or

IIA where L' is alkyl or poly(alkyl), alkylene or poly(alkylene), alkenyl or poly(alkenyl), alkenylene or poly(alkenylene), aromatic or an aromatic ring system, X is a leaving group, R" is an alkyl as defined above, and n is 1-4, with (b) an hydroxyl-containing carboxylic acid, (c) base, and (d) organic solvent in a vessel and mixing (a)-(d) for a time sufficient to form a compound within structures I or II, respectively and then reacting the hydroxyl-functionalized hydrocarbon compounds within structures I and II with a isocyanatoalkylalkoxysilane to form the inventive alkoxysilane-functionalized hydrocarbon compounds within structures III and IV, respectively.

In yet another aspect, the hydroxyl-functionalized hydrocarbon compounds so prepared are provided.

The present invention will be more fully appreciated by a reading of the "Detailed Description", and the illustrative examples which follow thereafter.

DETAILED DESCRIPTION

The present invention provides in one aspect a process for preparing an alkoxysilane-functionalized hydrocarbon compound made from (a)

I where L is alkyl or poly(alkyl), alkylene or poly(alkylene), alkenyl or poly(alkenyl), alkenylene or poly(alkenylene), aromatic or an aromatic ring system, R' is alkyl, such as from 1 to 10 carbon atoms, optionally interrupted by one or more oxygen atoms, m is 1-10 and n is 1-4, or

II where L' is defined as L above, R" is defined as R' above, and m and n are as defined as above, and (b) an isocyanatoalkylalkoxysilane, and optionally (c) organic solvent in a vessel, and mixing for a time sufficient to form an alkoxysilane-functionalized hydrocarbon compound.

L, or linker or linking groups, may be selected from alkyl or poly(alkyl), alkylene or poly(alkylene), alkenyl or poly(alkenyl), alkenylene or poly(alkenylene), aromatic or an aromatic ring system. The alkyl linker, when n is 1, may be an aliphatic group of 1 to 20 carbon atoms. The alkyl linker may be straight chain, branched chain or contain or be made from one or more cycloaliphatic group(s). The alkenyl linker, when n is 1, may be an unsaturated aliphatic group of 2 to 20 carbon atoms. The alkenyl linker may be straight chain, branched chain or contain or be made from one or more cycloaliphatic group(s). The aromatic linker, when n is 1, may have 6 to 20 carbon atoms.

When n is 2-4, the alkylene linker may be straight chain, branched chain or contain or be made from one or more cycloaliphatic group(s) of 1 to 20 carbon atoms, as appropriate; the alkenylene linker may be straight chain, branched chain or contain or be made from one or more cycloaliphatic group(s) of 2 to 20 carbon atoms, as appropriate. The aromatic linker may have from 6 to 20 carbon atoms.

The polymer versions of the alkyl, alkylene, alkenyl and alkenylene groups are defined similarly, except that each is made up of repeating residues in a block, graft or random order. The polymer versions are ordinarily defined by their molecular weights, which here are between about 1,000 Mn and about 500,000 Mn, and which may be tailored appropriately to the end use commercial for which they are destined. A particularly desirable polymer version is a poly(acrylate) made from one or more (meth)acrylate or acrylonitrile monomers. The polyacrylates should have a molecular weight in the range of about 1,000 Mn to about 50,000 Mn, such as about 30,000 Mn.

R' and R" may be selected from an alkyl group, as noted above, which may be from 1 to 10 carbon atoms, optionally interrupted by one or more oxygen atoms. Particularly desirable R' and R" groups are ethyl, propyl, butyl and hexyl, and methoxy ethyl.

The compound shown in structure I or II may have a central polyacrylate segment [where if made by a controlled radical polymerization ("CRP") technique will have such a segment about a central initiator segment] in or as "L". The initiator may be any of a variety of materials provided the initiator has one or more displaceable halogens. See e.g. U.S. Pat. No. 5,763,548. One desirable initiator, and the one used to make the polymers in the examples is

Diethyl-2,5-dibromoadipate

An example of the compound shown in structure I is an hydroxyl terminated polybutyl acrylate, like

A where I is an organic compound having one or more displaceable halogens and R is $C_4H_9$ and x is •78 so that the compound has a molecular weight of about 20,000; or the hydroxyl terminated butyl acrylate-ethyl acrylate-methoxyethyl acrylate terpolymer shown below:

where I and R are as defined above, x is 92, y is 25 and z is 6, so that the terpolymer has a molecular weight of about 30,000 Mn.

The representative polyacrylates have hydroxyl functional groups that are available to react with the isocyanate group of the isocyanatoalkylalkoxysilane to form the alkoxysilane-functionalized polyacrylates having urethane linkages.

The isocyanatoalkylalkoxysilane may be chosen from a host of possible choices. For instance, the isocyanato alkyl portion of the alkoxy silane may have as the alkyl residue a variety of linkages including methyl, ethyl, propyls, butyls, pentyls and hexyls, to name a few. The alkoxy portion of the alkoxysilane may be present once, twice or three times on the silicon atom of the silane and may be chosen from a variety of groups including methoxy, ethoxy, and propoxy.

A generic structure of the isocyanatoalkylalkoxysilane may be seen below where $R^1$ and $R^2$ are selected from alkyl groups having from 1 to 4 carbon atoms, and $R^3$ is selected from alkylene and arylene residues, and x and y are each independently 0-3, such as when x is 3, y is 0 and when x is 2, y is 1.

Commercially available examples of the isocyanatoalkylalkoxysilanes include 3-isocyanatomethyldiethoxysilane, 3-isocyanatomethyldimethoxysilane, 3-isocyanatomethyltriethoxysilane and 3-isocyanatomethyltrimethoxysilane.

Because of the large number of commercially available isocyanatoalkoxysilanes (of which the ones recited above are but a few), the process so described provides great flexibility for modifying the underlying polymer and the properties desired. And because isocyanatoalkoxysilanes are generally high boiling liquids, the process so described may be carried out in ordinary reactors, which is another savings for equipment, laboratory and production plant blue print, and process time.

The isocyanatoalkylalkoxysilane should be used in a molar excess to the compound shown in structure I or II. For instance, a 2 to 10 molar excess, such as 4 to 8 molar excess, is desirable.

Optionally, the process may be conducted in an appropriate organic solvent, which is aprotic and not reactive with any of the starting materials or reagents used in the process. Desirably, when used, the organic solvent is dimethyl sulfoxide, toluene, xylene, an alkyl acetate, such as ethyl acetate, or acetonitrile.

The so formed inventive alkoxysilane functional hydrocarbon compounds are within structure III or IV below:

where L is alkyl or poly(alkyl), alkylene or poly(alkylene), alkenyl or poly(alkenyl), alkenylene or poly(alkenylene), aromatic or an aromatic ring system, R' is alkyl, $R^1$ and $R^2$ are each independently selected from alkyl groups having from 1 to 4 carbon atoms, and $R^3$ is selected from alkylene and arylene residues, m is 1-10, n is 1-4, and x and y are each independently 0-3, such that when x is 3, y is 0 and when x is 2, y is 1, or where L' is alkyl or poly(alkyl), alkylene or poly(alkylene), alkenyl or poly(alkenyl), alkenylene or poly(alkenylene), aromatic or an aromatic ring system, R" is alkyl, $R^1$ and $R^2$ are each independently selected from alkyl groups having from 1 to 4 carbon atoms, and $R^3$ is selected from alkylene and arylene residues, m is 1-10, n is 1-4, and x and y are each independently 0-3, such that when x is 3, y is 0 and when x is 2, y is 1.

An example of the compound shown in structure III is an alkoxysilane terminated polybutyl acrylate, like

C where 1 is an organic compound having one or more displaceable halogens and R is $C_4H_9$ and x is 78 so that the compound has a molecular weight of about 20,000; or the alkoxysilane terminated butyl acrylate-ethyl acrylate-methoxyethyl acrylate terpolymer shown below:

D where I and R are as defined above, x is 92, y is 25 and z is 6, so that the terpolymer has a molecular weight of about 30,000 Mn.

In practicing the process, mixing occurs (with or without solvent) at elevated temperature desirably for a period of time of about 2 to about 48 hours, such as about 2 to about 24 hours, to achieve a yield of greater than about 90% of the alkoxysilane-functionalized hydrocarbon compound.

The process for preparing the alkoxysilane-functionalized hydrocarbon compounds from

I where L is alkyl or poly(alkyl), alkylene or poly(alkylene), alkenyl or poly(alkenyl), alkenylene or poly(alkenylene), aromatic or an aromatic ring system, R' is alkyl, such as from about 1 to about 10 carbon atoms, m is 1-10 and n is 1-4, or

II where L' is alkyl or poly(alkyl), alkylene or poly(alkylene), alkenyl or poly(alkenyl), alkenylene or poly(alkenylene), aromatic or an aromatic ring system, R" is alkyl, m is 1-10 and n is 1-4, may employ a compound having a polymeric, oligomeric or elastomeric central portion for L, as noted above.

Prior to making compounds within structure I or II, a compound with a leaving group in an alpha position to a carboxylic acid ester is first reacted with an hydroxyl-functionalized carboxylic acid (such as in structure I or II), oftentimes in the presence of base.

The compound with the leaving group (represented below in structures IA and IIA as X) in the alpha position to a carboxylic acid ester may be depicted as (IA)

where L is alkyl or poly(alkyl), alkylene or poly(alkylene), alkenyl or poly(alkenyl), alkenylene or poly(alkenylene), aromatic or an aromatic ring system, X is a leaving group, R' is an alkyl as defined above, and n is 1-4, or

IIA where L' is alkyl or poly(alkyl), alkylene or poly(alkylene), alkenyl or poly(alkenyl), alkenylene or poly(alkenylene), aromatic or an aromatic ring system, X is a leaving group, R" is an alkyl as defined above, and n is 1-4.

The process reacts structure IA or IIA with (b) an hydroxyl-containing carboxylic acid, and (c) base, and (d) optionally, organic solvent in a vessel and mixing for a time sufficient to form a compound within structure I or II, respectively.

Examples of such carboxylic acids may be within the following structure:

where m is 1-10.

Specific examples of carboxylic acids with that structure include glycolic acid, 3-hydroxypropanoic acid, 3-hydroxybutyric acid, 2-hydroxybutyric acid, alpha-hydroxyisovaleric acid, 3-hydroxy-2,2-dimethylpropanoic acid, 2-hydroxy-3-methylbutyric acid, 2-hydroxy-4-methylpentanoic acid and 3-hydroxy-3-methylpentanoic acid, though these are just representative. Of course, isomers—structural, geometric and chiral—of these examples are included.

It may be particularly useful to employ a CRP technique, which is capable of introducing a given functional group into a defined position on the polymer, L, such as at the terminus. CRP is advantageous because of the low velocity polymerization and low tendency of termination by radical-radical coupling, a termination reaction does not easily take place, thus giving a polymer with a narrow molecular weight distribution (Mn/Mn=about 1.1 to 1.5), and because the molecular weight can be freely controlled by adjusting the monomer/initiator charge ratio.

A variety of CRP techniques may be used to make compounds within structure I or II (or IA or IIA for that matter) including but not limited to atom transfer radical polymerization ("ATRP"), single electron transfer living radical polymerization ("SET-LRP")", and reversible addition fragment transfer ("RAFT"), to name a few. In ATRP a vinyl monomer is polymerized using an organohalogen compound or a sulfonyl halide compound as the initiator and a transition metal complex as the catalyst. In the CRP methods, which are particularly attractive in the context of the present invention, in addition to the noted advantages, a polymer having a halogen atom at its terminus may be formed. A halogen atom in that position on the polymer is particularly interesting because of the ease with which it may be displaced to form a (meth)acrylate functional group.

As noted above, the alkoxysilane-functionalized hydrocarbon compounds may be formulated with a curable matrix. Desirably, the curable matrix comprises a moisture curable polyacrylate, such as one bearing alkoxy functionality.

The amount of curable matrix will vary, but ordinarily when used it will be present in a by weight ratio from about 3:1 to about 1:3 to that of the alkoxysilane-functionalized hydrocarbon compounds.

The moisture curable composition, whether formulated with a curable matrix or simply based on the alkoxysilane-functionalized hydrocarbon compounds made by the processes disclosed herein, should also include a moisture cure catalyst.

The moisture cure catalysts include tin IV salts of carboxylic acids, such as dibutyltin dilaurate, organotitanium compounds such as tetrabutyl titanate, and partially chelated derivatives of these salts with chelating agents. Desirably, tetraisopropyltitanate, dibutyltin dilaurate and tetramethylguanidine at levels of about 0.05 to about 0.5% by weight are used.

Other additives such as thickeners, non-reactive plasticizers, fillers, toughening agents (such as elastomers and rubbers) and other well-known additives may be incorporated therein where the art-skilled believes it would be desirable to do so. In addition, cross linking agents may also be incorporated therein, examples of which being substituted trialkoxysilanes.

The invention also provides a process for preparing a reaction product from the moisture curable composition, the steps of which include applying the composition to a desired substrate surface and exposing the composition to appropriate conditions for a time sufficient to cure the composition.

In view of the above description, it is clear that a wide range of practical opportunities is provided. The following examples are provided for illustrative purposes only, and are not to be construed so as to limit in any way the teaching herein.

EXAMPLES

Rheometric analysis was done on a TA Instruments AR2000EX Rheometer with 8 mm diameter parallel plates at a gap of 1.0 mm. Solventless mixing was performed with the use of a FlackTec Speedmixer.

A. Synthesis

Example 1

Figure 2:
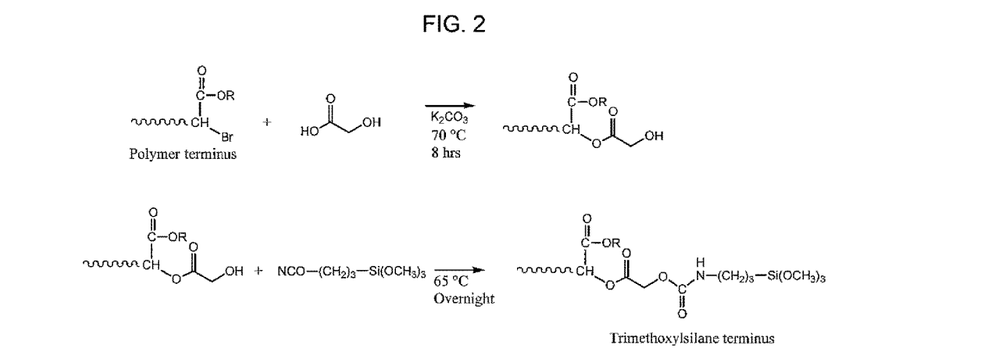
FIG. 2 shows a synthetic scheme by which the inventive alkoxysilane-functionalized hydrocarbon compounds starting from hydroxyl-functionalized hydrocarbon compounds and a synthetic scheme by which the alkoxysilane-functionalized hydrocarbon compounds may be prepared.
Figure 3:
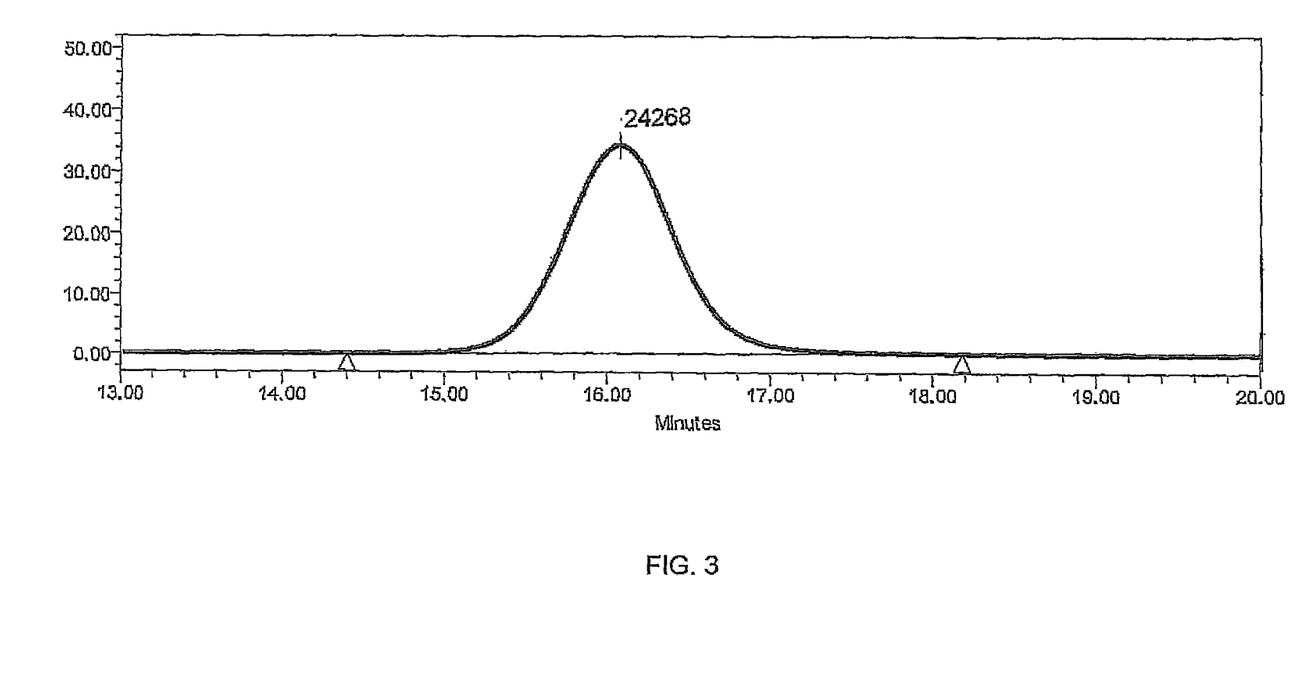
FIG. 3 shows GPC analysis of a 25,000 MW polyacrylate terpolymer made in accordance with Example 1 and the scheme set forth in FIG. 2.

The synthetic scheme laid out in FIG. 2 was followed below.

Prior to beginning the reaction, copper mesh (1.52 g) was soaked in acetone with 1000 ppm hydrazine hydrate for a period of time of about 45 minutes at room temperature.

To a 3-L polymerization vessel was added ethyl acrylate (400.38 g; 3.99 moles), ethylene glycol methyl ether acrylate (369.34 g, 2.83 moles), n-butyl acrylate (777.09 g, 6.06 moles), dimethylsulfoxide (393.7 g), acetone (283.1 g), tris(2-methylaminoethyl)amine (1.153 g, 0.005 moles), copper (II) bromide (0.112 g, 0.0005 moles), and diethyl meso-2,5-dibromoadipate (17.03 g; 0.05 moles). The soaked copper mesh was removed from the solution, rinsed with acetone, and wrapped securely around the sealed sparge tube, prior to sealing the polymerization vessel. A sparge tube was held in place above the reaction mixture (in the head space of the polymerization vessel).

The reaction mixture was stirred and heated to a temperature of about 30° C. The reaction mixture was purged with argon by means of a sparge tube for a period of time of about 45 minutes. The copper mesh was then introduced to the reaction mixture. After an induction time of about 3 minutes, the reaction temperature and monomer conversion was observed to increase—after about 6 hours, the reaction temperature and monomer conversion had increased to 34° C. and 80.8%, respectively, at which point the reaction was terminated by purging with air for a period of time of about 30 minutes.

The so-formed terpolymer was analyzed by chromatographic and spectroscopic analyses. Size exclusion chromatography (SEC: THF; 1 mL/min; RI detector; PMMA calibration) indicated a number average molecular weight (Mn) of 24,634 and a polydispersity of 1.12. Residual bromide by x-ray fluorescence showed 6,188 ppm Br, which corresponds well to the 6,385 theoretical ppm Br.

The terpolymer was then treated with etidronic acid (2500 ppm) and allowed to stir for a period of time of 3 hours at a temperature of 70° C. before being filtered through a 0.5 micron filter pad. The solution was then 'pot stripped' to remove any unreacted acrylate monomers to yield 1,976 g of bromine-terminated polyacrylate in solution.

This solution was treated with glycolic acid (45.39 g, 0.596 moles) and potassium carbonate (41.25 g, 0.298 moles), and allowed to react at a temperature of about 70° C. for a period of time of over 12 hours, at which point the reaction mixture was diluted with toluene (~2 L) and subjected to two brine washes. The organic phase was isolated and dried over magnesium sulfate before being filtered through a 0.5 micron filter pad.

The collected solution was treated with isocyanatopropyltrimethoxysilane (123.6 g, 0.602 moles) and 0.05% bismuth octanoate and allowed to react overnight at a temperature of about 65° C. The reaction mixture was concentrated by rotary evaporation for a period of time of about 6 hours at a temperature of about 60° C. under a reduced pressure of about <200 mTorr. The resultant polyacrylate (1.02 kg, 82% yield) was stored under nitrogen.

Moisture curable functionality on the material was confirmed through $^{13}$C NMR: (O—CH$_3$, 50 ppm), and $^1$H NMR: (O—CH$_3$, 3.3 ppm). Residual NCO was titrated to yield ~0.17%.

B. Moisture Curable Adhesive Formulation

Example 2

The alkoxysilane-functionalized polyacrylate formed in Example 1 was used in a formulation to evaluate its moisture curability and performance.

The formulation is as described below in the table, with the Kaneka OR110S moisture curable polyacrylate resin used in a control sample.

| Compound | Type | wt % |
| --- | --- | --- |
| Kaneka OR110S or SET polymer | moisture-curable polyacrylate resin | 83.67% |
| Mesamoll | plasticizer (alkyl sulfonic ester of phenol) | 6.33% |
| Cab-O-Sil TS530 | silica filler | 4.19% |
| vinyltrimethoxysilane | crosslinker | 1.66% |
| aminopropyltrimethoxysilane | crosslinker | 2.08% |
| dibutyltin dilaurate | catalyst | 2.08% |

Figure 4:
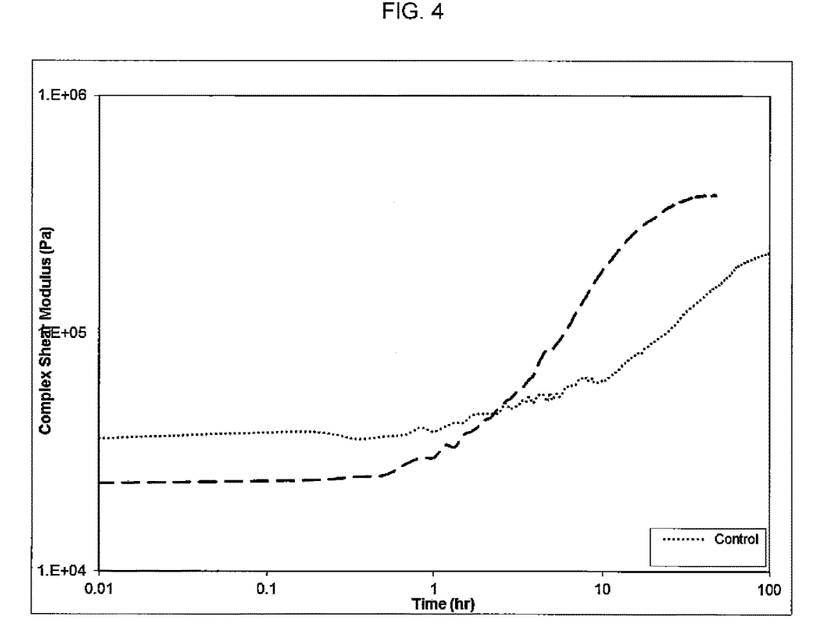
FIG. 4 shows Rheometric analysis in terms of complex shear modulus over time of a formulation made with the 25,000 MW terpolymer (represented by dashed lines) and one made with the Kanaka OR110S control (represented with dotted lines), as presented in the Table in Example 2.

The compounds were added to a vessel in the order listed and then mixed with a DAC 150 speedmixer after the Cab-O-Sil addition and again after catalyst addition (3 minutes at 2750 rpm both times). The samples were loaded onto a TA Instruments AR2000EX rheometer with 8 mm diameter parallel plates at a gap of 1.0 mm. For the oscillatory rheometer experiment, strain was set at 0.04% with a minimum torque specification of 30 microN*m; frequency was set to 30 rad/s. One data point was collected every ten minutes over a total experiment run time of six or seven days. Complex shear modulus was plotted as a function of time to determine relative cure speed and degree of ultimate cure for the different moisture cure formulations. The results are shown in FIG. 4. The inventive sample provides a modulus upon moisture cure that is greater than that of the control sample.

What is claimed is:
1. A process for preparing alkoxysilane-functionalized hydrocarbon compounds, comprising:
   A. Providing (a) an hydroxyl-functionalized compound comprising

I wherein L is alkyl or poly(alkyl), alkylene or poly(alkylene), alkenyl or poly(alkenyl), alkenylene or poly(alkenylene), aromatic or an aromatic ring system, R' is alkyl, and m is 1-10 and n is 1-4, or

II and (b) an isocyanatoalkylalkoxysilane, and optionally (c) organic solvent, and
   B. Mixing (a), (b) and if present (c) for a time sufficient to form an alkoxysilane-functionalized hydrocarbon compound.
2. The process of claim 1, wherein the alkoxysilane-functionalized hydrocarbon compound is within structure III or IV, respectively

III wherein L is alkyl or poly(alkyl), alkylene or poly(alkylene), alkenyl or poly(alkenyl), alkenylene or poly(alkenylene), aromatic or an aromatic ring system, R' is alkyl, $R^1$ and $R^2$ are each independently selected from alkyl groups having from 1 to 4 carbon atoms, and $R^3$ is selected from alkylene and arylene residues, and m is 1-10, n is 1-4, and x and y are each independently 0-3, such that when x is 3, y is 0 and when x is 2, y is 1, or

IV wherein L' is alkyl or poly(alkyl), alkylene or poly(alkylene), alkenyl or poly(alkenyl), alkenylene or poly(alkenylene), aromatic or an aromatic ring system, R" is alkyl, $R^1$ and $R^2$ are each independently selected from alkyl groups having from 1 to 4 carbon atoms, and $R^3$ is selected from alkylene and arylene residues, and m is 1-10, n is 1-4, and x and y are each independently 0-3, such that when x is 3, y is 0 and when x is 2, y is 1.

3. The process of claim 1, wherein the organic solvent is ethyl acetate.

4. The process of claim 1, wherein mixing occurs at elevated temperature.

5. The process of claim 1, wherein mixing at elevated temperature occurs for a period of time of about 2 to about 24 hours.

6. The process of claim 1, wherein mixing at elevated temperature occurs for a period of time of about 2 to about 24 hours to achieve a yield of greater than about 90% of the alkoxysilane-functionalized hydrocarbon compound.

7. The process of claim 1, wherein the compound shown in structure I or II was made by a controlled radical polymerization technique.

8. A process for preparing alkoxysilane-functionalized hydrocarbon compounds, comprising:

A. Providing

IA wherein L is alkyl or poly(alkyl), alkylene or poly(alkylene), alkenyl or poly(alkenyl), alkenylene or poly(alkenylene), aromatic or an aromatic ring system, X is a leaving group, R' is alkyl, and n is 1-4, or

IIA wherein L' is alkyl or poly(alkyl), alkylene or poly(alkylene), alkenyl or poly(alkenyl), alkenylene or poly(alkenylene), aromatic or an aromatic ring system, X is a leaving group, R" is alkyl, and n is 1-4, an hydroxyl-containing carboxylic acid, base, and optionally organic solvent, and reacting for a time sufficient to form an hydroxyl functionalized hydrocarbon compound within structure I or II, respectively,

I wherein L is alkyl or poly(alkyl), alkylene or poly(alkylene), alkenyl or poly(alkenyl), alkenylene or poly(alkenylene), aromatic or an aromatic ring system, R' is alkyl, and m is 1-10 and n is 1-4, or

II wherein L' is alkyl or poly(alkyl), alkylene or poly(alkylene), alkenyl or poly(alkenyl), alkenylene or poly(alkenylene), aromatic or an aromatic ring system, R" is alkyl, and m is 1-10 and n is 1-4, and

B. Providing a compound within structure I or II, an isocyanatoalkylalkoxysilane, and optionally organic solvent, and reacting for a time sufficient to form an alkoxysilane-functionalized hydrocarbon compound.

9. The process of claim 8, wherein the alkoxysilane-functionalized hydrocarbon compound is within structure III or IV, respectively

III wherein L is alkyl or poly(alkyl), alkylene or poly(alkylene), alkenyl or poly(alkenyl), alkenylene or poly(alkenylene), aromatic or an aromatic ring system, R' is alkyl, $R^1$ and $R^2$ are each independently selected from alkyl groups having from 1 to 4 carbon atoms, and $R^3$ is selected from alkylene and arylene residues, and m is 1-10, n is 1-4, and x and y are each independently 0-3, such that when x is 3, y is 0 and when x is 2, y is 1, or wherein L' is alkyl or poly(alkyl), alkylene or poly(alkylene), alkenyl or poly(alkenyl), alkenylene or poly(alkenylene), aromatic or an aromatic ring system, R" is alkyl, $R^1$ and $R^2$ are each independently selected from alkyl groups having from 1 to 4 carbon atoms, and $R^3$ is selected from alkylene and arylene residues, and m is 1-10, n is 1-4, and x and y are each independently 0-3, such that when x is 3, y is 0 and when x is 2, y is 1.

10. An alkoxysilane-functionalized hydrocarbon compound made in accordance with the process of claim 1.

11. An alkoxysilane-functionalized hydrocarbon compound within structure HI or IV, respectively wherein L is alkyl or poly(alkyl), alkylene or poly(alkylene), alkenyl or poly(alkenyl), alkenylene or poly(alkenylene), aromatic or an aromatic ring system, R' is alkyl, $R^1$ and $R^2$ are each independently selected from alkyl groups having from 1 to 4 carbon atoms, and $R^3$ is selected from alkylene and arylene residues, and m is 1-10, n is 1-4, and x and y are each independently 0-3, such that when x is 3, y is 0 and when x is 2, y is 1, or wherein L' is alkyl or poly(alkyl), alkylene or poly(alkylene), alkenyl or poly(alkenyl), alkenylene or poly(alkenylene), aromatic or an aromatic ring system, R" is alkyl, $R^1$ and $R^2$ are each independently selected from alkyl groups having from 1 to 4 carbon atoms, and $R^3$ is selected from alkylene and arylene residues, and m is 1-10, n is 1-4, and x and y are each independently 0-3, such that when x is 3, y is 0 and when x is 2, y is 1.

12. A moisture curable composition, comprising:
   (a) an alkoxysilane-functionalized hydrocarbon compound of claim 11; and
   (b) a moisture cure catalyst.

13. The composition of claim 12, further comprising one or more of a filler component, a toughening component, a plasticizer component and a cross linker component.

14. The process of claim 8, wherein X is a halogen, tosylate or mesylate.

15. The process of claim 14, wherein the halogen is selected from chlorine, bromine or iodine.

16. The process of claim 8, wherein the base is potassium carbonate or a trialkyl amine.

* * * * *